(12) United States Patent
Black et al.

(10) Patent No.: US 8,611,325 B2
(45) Date of Patent: Dec. 17, 2013

(54) METHOD AND APPARATUS FOR PLUG-AND-PLAY VENUE-CAST CO-CHANNEL WITH WIDE-AREA NETWORK

(75) Inventors: Peter John Black, San Diego, CA (US); Matthew Stuart Grob, La Jolla, CA (US); Raghuraman Krishnamoorthi, San Diego, CA (US); Mingxi Fan, San Diego, CA (US); Jiming Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 1076 days.

(21) Appl. No.: 12/570,577

(22) Filed: Sep. 30, 2009

(65) Prior Publication Data

US 2010/0080189 A1    Apr. 1, 2010

Related U.S. Application Data

(60) Provisional application No. 61/101,947, filed on Oct. 1, 2008.

(51) Int. Cl.
| | |
|---|---|
| *H04B 7/216* | (2006.01) |
| *H04W 4/00* | (2009.01) |
| *H04L 12/66* | (2006.01) |
| *H04J 3/16* | (2006.01) |
| *G06F 3/00* | (2006.01) |

(52) U.S. Cl.
USPC ............ 370/342; 370/331; 370/352; 370/320; 370/466; 725/38

(58) Field of Classification Search
USPC ............. 370/331, 352, 320, 466; 725/38
See application file for complete search history.

(56) References Cited

U.S. PATENT DOCUMENTS

| | | | |
|---|---|---|---|
| 5,570,355 A | * | 10/1996 | Dail et al. ............... 370/352 |
| 6,404,775 B1 | * | 6/2002 | Leslie et al. ............ 370/466 |
| 2003/0078050 A1 | | 4/2003 | Carlborg et al. |

(Continued)

FOREIGN PATENT DOCUMENTS

WO     2007118101     10/2007

OTHER PUBLICATIONS

Oh. "Mediaflo Technologies", Asia-Pacific Telecommunity, The 2nd Meeting of the APT Wireless Forum, Shenzhen, China, Sep. 2005, 16 pages.

(Continued)

*Primary Examiner* — Ian N Moore
*Assistant Examiner* — Kiet Tang
(74) *Attorney, Agent, or Firm* — Jeffrey D. Jacobs

(57) ABSTRACT

A system, method, and apparatus for providing venue-cast service in a wireless access network are disclosed. A local transmitter can request reservation of air link resources on the wireless access network for a venue-cast transmission. The local transmitter can receive a forward link signal with a timing reference for data transmitted on the wireless access network such as, for example, the forward link signal in an EV-DO network or a FLO-based media distribution system. Based on the timing reference, the local transmitter can transmit venue-cast information in a same frequency band as the forward link signal utilizing the reserved air link resources. Optionally, the venue-cast system can include a collocated network repeater and the local transmitter can synchronize its timing and transmit power to the forward link signal from the repeater.

31 Claims, 10 Drawing Sheets

(56) References Cited

U.S. PATENT DOCUMENTS

| | | |
|---|---|---|
| 2005/0002349 A1* | 1/2005 | Hayashi et al. ............... 370/320 |
| 2005/0122928 A1 | 6/2005 | Vijayan et al. |
| 2007/0204294 A1* | 8/2007 | Walker et al. .................. 725/38 |
| 2007/0232251 A1 | 10/2007 | Murthy et al. |
| 2007/0232366 A1 | 10/2007 | Chen et al. |
| 2008/0089288 A1* | 4/2008 | Anschutz et al. ............. 370/331 |

OTHER PUBLICATIONS

Qualcomm, Inc., "1xEV 1x EVolution IS-856 TIA/EIA Standard", Airlink Overview Nov. 4, 2001 27 pages.
3GPP2 C.S0024-A, "cdma2000 High Rate Packet Data Air interface Specification", Jul. 2005, Version 2.0, 1227 pages.
Guo, "Mobile TV and 3G Multicast", Alcatel Lucent, Bells Lab, Oct. 30, 2007, 39 pages.
TIA-856-A cdma2000 High Rate Packet Data Air Interface Specification, Apr. 2004. 1082 pages.
Lee, "3GPP2 Broadcast and Multicast Services BCMCS", KRnet 2005, Jun. 2005, 40 pages.
International Search Report and Written Opinion—PCT/US2009/059235—ISA/EPO—Mar. 1, 2010.
"Taiwan Search Report—TW098133437—TIPO—Nov. 19, 2012".

\* cited by examiner

METHOD AND APPARATUS FOR PLUG-AND-PLAY VENUE-CAST CO-CHANNEL WITH WIDE-AREA NETWORK

CROSS-REFERENCES TO RELATED APPLICATIONS

This application claims the benefit of U.S. Provisional Application Ser. No. 61/101,947, filed Oct. 1, 2008, and entitled "METHOD AND APPARATUS FOR PLUG-AND-PLAY VENUE-CAST CO-CHANNEL WITH WIDE-AREA NETWORK," which is incorporated herein by reference in its entirety.

BACKGROUND

The present disclosure relates generally to communication systems and, more specifically, to content delivery within a wide area network.

Mobile broadcast is a technology that offers attractive services to consumers. Some of the key applications include mobile TV, mobile advertisement, and media distribution via clip-cast. Mobile devices which can access mobile broadcast services are now widely available.

The availability of mobile broadcast service within a particular geographic area is determined by network operators. In some cases, a subscriber network may require reconfiguration or a technology upgrade in order to support the full range of mobile broadcast services. In other cases, mobile service broadcast may be available with limited choices which do not necessarily meet the needs of all users.

Increasingly, there is a demand for venue-specific content. For example, it might be attractive to receive a live broadcast from different corners of a NASCAR racetrack while seated within the stadium. Similarly, businesses may wish to alert potential customers in the vicinity of their stores to sales or other special events. It is therefore desirable to facilitate delivery of location-specific content.

BRIEF SUMMARY

A system, method, and apparatus for providing venue-cast service in a wireless access network are disclosed. A local transmitter can request reservation of air link resources on the wireless access network for a venue-cast transmission. The local transmitter can receive a forward link signal with a timing reference for data transmitted on the wireless access network such as, for example, the forward link signal in an EV-DO network or a FLO-based media distribution system. Based on the timing reference, the local transmitter can transmit venue-cast information in a same frequency band as the forward link signal utilizing the reserved air link resources. Optionally, the venue-cast system can include a collocated network repeater and the local transmitter can synchronize its timing and transmit power to the forward link signal from the repeater for minimizing interference with the wireless access network.

In one embodiment, a venue-cast transmitter is disclosed. The venue-cast transmitter includes a receiver configured to receive the forward link signal of a wireless access network. The forward link signal includes a timing reference for data transmitted on the wireless access network. The venue-cast transmitter also includes a transmitter configured to transmit a data signal comprising venue-cast content in a same frequency band as the forward link signal. A processor is coupled to the receiver and the transmitter. The processor is configured to detect at least one vacated time slot in the forward link signal based on the timing reference and to output the data signal during an interval defined by the at least one vacated time slot.

In one embodiment, a method of providing venue-cast content with a local transmitter within a coverage area of a wide area network is disclosed. The method includes receiving the venue-cast content at a first interface of the local transmitter and receiving a forward link signal of the wireless access network at a second interface of the local transmitter. The method also includes detecting in the forward link signal a timing reference for data transmitted on the wireless access network and transmitting a second signal comprising the venue-cast content. The second signal is transmitted based on the timing reference and in a same frequency band as the forward link signal.

In another embodiment, a localized content transmission system is disclosed. The system includes a repeater configured to replicate a forward link signal of a wireless access network and a receiver configured to receive the forward link signal from the repeater. The receiver is configured to detect a timing reference for data transmitted on the wireless access network in the received signal. The system includes a transmitter configured to transmit a data signal including the localized content in a same frequency band as the forward link signal. The system also includes a processor configured to detect at least one vacated time slot in the received forward link signal based on the timing reference and to output the data signal to coincide with the at least one vacated time slot.

In still another embodiment, a venue-cast system is disclosed. The system includes means for receiving a forward link signal of the wireless access network and means for repeating the forward link signal. The system includes means for detecting a timing reference for data transmitted on the wireless access network in the repeated signal and means for determining the arrival of a vacated time slot in the forward link signal based on the timing reference. The system includes means for transmitting a second signal comprising localized content in a same frequency band as the forward link signal of the wireless access network based on the timing reference.

In a further embodiment, a computer-readable medium having encoded thereon a sequence of one or more program instructions is disclosed. The program instructions cause one or more processors of a local transmitter to perform steps including receiving a forward link signal of the wireless access network at the local transmitter and detecting a timing reference in the forward link signal for data transmitted on the wireless access network. The steps also include detecting at least one vacated time slot in the forward link signal based on the timing reference and transmitting a second signal comprising venue-cast content in a same frequency band as the forward link signal to coincide with the at least one vacated time slot.

Additional aspects of the invention will become apparent based on the following description and with reference to the accompanying drawings.

DETAILED DESCRIPTION OF EMBODIMENTS

Figure 1:
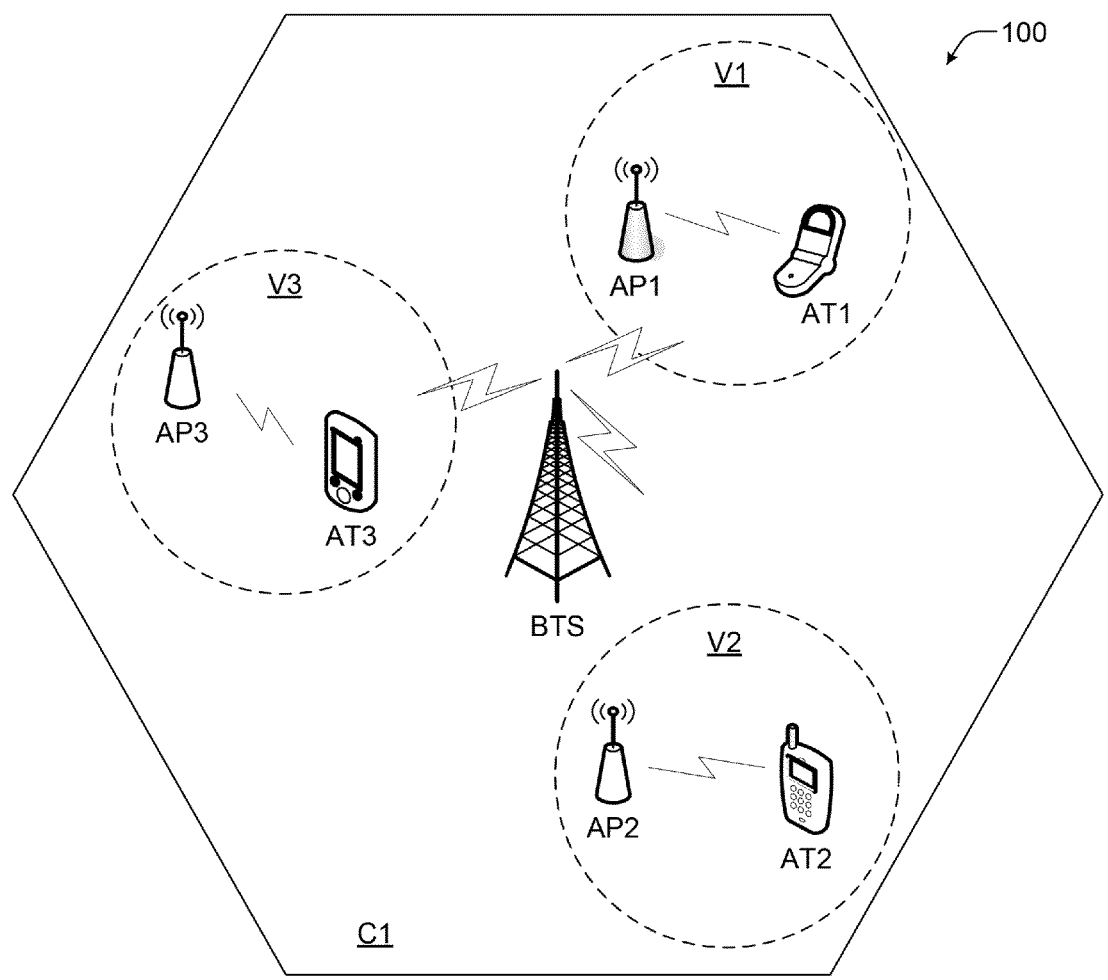
FIG. 1 is a block diagram of an embodiment of a venue-cast system.

FIG. 1 shows a venue-cast system 100 according to embodiments of the present invention. As used herein, "venue-cast" refers to delivery of localized content to one or more access terminals. The localized content may include location-specific programming such as event coverage at a sports venue. Content may also be localized in the sense that it is intended for distribution only within a limited geographic area which is part of a larger communication system.

A base station BTS is shown in relation to its coverage area C1. Base station BTS can be part of a wireless access network such as a cellular telephone, data-optimized, or other macro communications network. For example, base station BTS can be the serving base station for coverage area C1. In general, base station BTS sends information to subscriber terminals within its coverage area C1 on a forward link channel and receives information from the subscriber terminals on a reverse link channel. In an exemplary embodiment, the wireless access network is a CDMA2000 EV-DO network and base station BTS supports both unicast and multicast service to subscriber terminals within its coverage area C1. CDMA2000 refers generally to a family of wireless air interface standards that include IMT-2000. Also, as used herein, EV-DO is intended to broadly encompass TIA-856 (Telecommunications Industry Association) with its revisions and related standards.

Subscriber terminals AT (also "access terminals") can be any devices which are capable of receiving wireless communications. These may include mobile telephones, smartphones, personal digital assistants, notebooks, netbooks, and like devices. In one embodiment, access terminals AT are capable of receiving and demodulating OFDM (orthogonal frequency division multiplexing) waveforms. For example, access terminals AT may be configured to receive and demodulate EV-DO TDM (time-division multiplexing) and OFDM forward link waveforms also known as Platinum BCMCS (Broadcast-Multicast Service).

As shown, coverage area C1 includes multiple venues V in which venue-cast services are provided. For example, venue V1 can represent a baseball stadium for which streaming audio/video coverage of the bullpen area, batter's box, and dugouts is available. Venue V2 can represent a shopping mall in which shoppers are informed of sales, discounts, and other mall-based services through a venue-cast. Venue V3 can be a college campus which makes available current events programming and promotes coming attractions.

Within the venues, the venue-cast is provided by one or more local transmitters AP on a same operating frequency (or frequency band) as the forward link signal from base station BTS. Local transmitters AP can be configured to detect a timing reference in the forward link signal and to transmit venue-cast content based on the timing reference. The venue-cast transmission is thus co-channel with the BTS signal as opposed to being an adjacent channel transmission on a different frequency. This means that access terminal AT1 in venue V1 is capable of receiving unicast service on the wireless access network and venue-cast content from AP1 in the same frequency band. Similarly, access terminal AT2 can receive unicast service from the wireless access network and venue-cast service from local transmitter AP2 in the same frequency band, and so on. With the venue-cast system, it is thus possible to share the spectrum of the wireless access network in a time-division fashion with venue-cast services.

Preferably, the co-channel venue-cast transmission is plug-and-play with existing mobile technology. In one embodiment, the venue-cast transmission is OFDM-based and includes dedicated pilot signals. For example, the local transmitter can comply with BCMCS standards promulgated by the 3GPP2 group (3rd Generation Partnership Project 2) and commonly known Platinum BCMCS or some other standards-based format. OFDM-based receivers are widely available and commonly found in mobile handsets and computing devices so that special hardware is not required to receive OFDM venue-cast transmissions. The dedicated pilot signal aids in demodulation and enables the access terminal to receive venue-cast content even if base station BTS has limited multicast capabilities.

In some embodiments, each local transmitter AP registers its venue-cast information with base station BTS. Registration can include reserving time slots in the forward link channel and providing control/overhead information needed to demodulate the venue-cast signal. In an EV-DO access network, the BTS can reserve (blank out) a fraction of the time slots in the forward link channel so that no data is transmitted on the slots reserved for a venue-cast. The BTS can also announce the availability of the venue-cast in a broadcast overhead message (BOM) to inform access terminals AT as to the time slots and configuration parameters for receiving the venue-cast content.

The local transmitters AP can transmit the venue-cast at a power level that is based on the power level of the forward link signal to avoid interference with the macro wireless access network. Local transmitters AP can also restrict access to venue-casts by encrypting or otherwise obscuring their content. In some embodiments, the base station BTS or a local transmitter AP can supply keying material or other information needed to access a venue-cast. By restricting access, it is possible to create a revenue stream from wireless access network subscribers who are interested in receiving the venue cast content.

Figure 2:
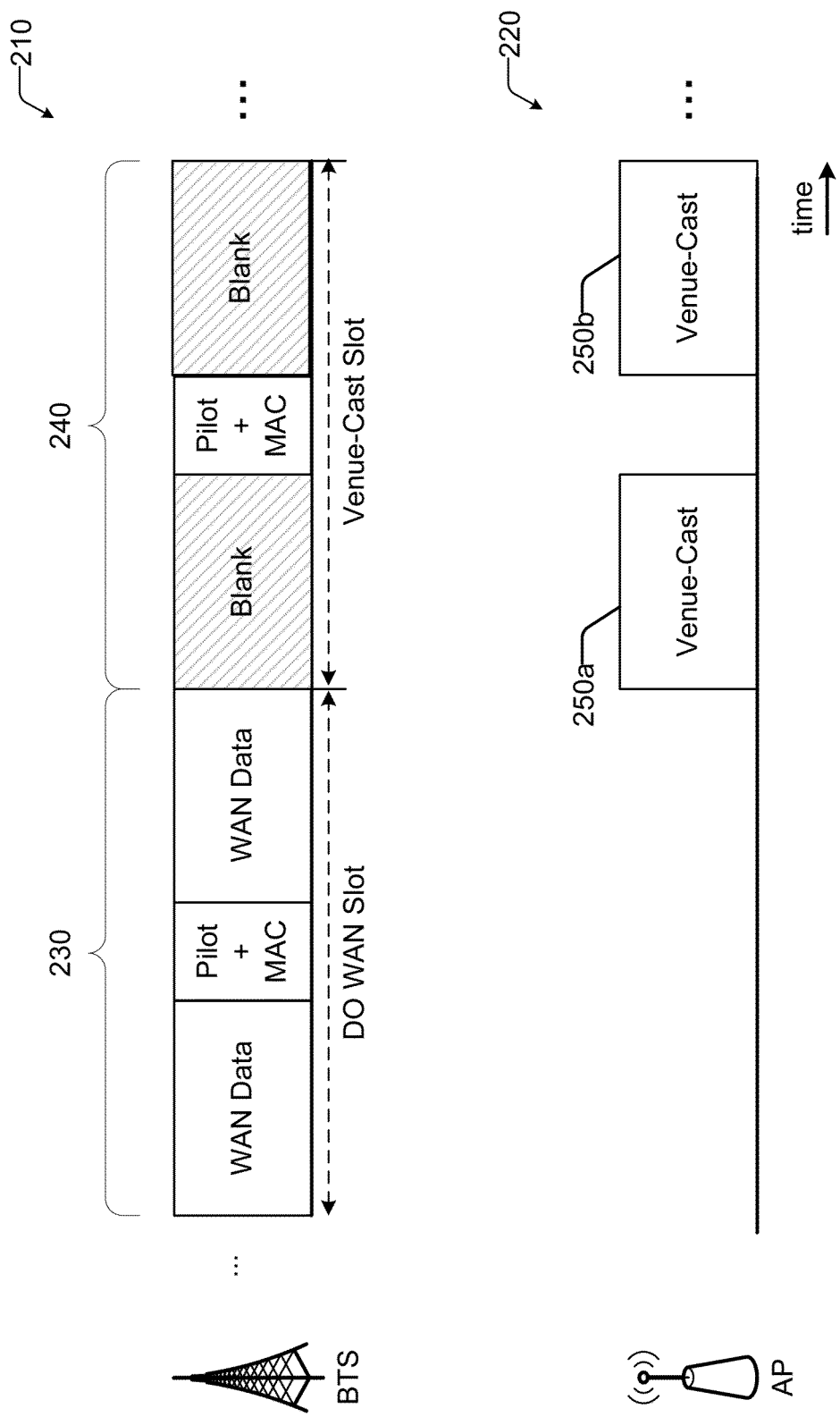
FIG. 2 shows aspects of co-channel signaling in a venue-cast system.

FIG. 2 shows aspects of co-channel signaling in a venue-cast system according to various embodiments of the present invention. Base station BTS and local transmitter AP can be as described in FIG. 1.

Signal 210 represents the forward link channel from base station BTS and signal 220 represents a venue-cast transmission from the local transmitter AP. An EV-DO access network is used for purposes of illustration. However, it will be understood that the present invention is not limited to a specific type of access network and that the following discussion is therefore illustrative only. In particular, embodiments of the present invention can be used with a variety of physical layer technologies including FLO (forward link only) signals and mobile television distribution systems.

Forward link channel 210 is divided into exemplary time slots 230, 240. In an EV-DO network, for example, each time slot in the forward link signal includes a group of time-multiplexed channels. These include a pilot channel, a medium access control (MAC) channel, and a traffic channel. As shown, time slot 230 includes a first WAN data segment followed by a pilot signal and MAC information, and then by a second WAN data segment. The WAN data segments, for example, can include unicast or multicast data from the wireless access network. The pilot signal and MAC information can be used by access terminals AT to identify the channel and to determine when their data is scheduled.

Local transmitter AP can monitor the forward link channel using the pilot signal as a timing reference. When a venue-cast slot arrives, the local transmitter AP transmits data 250a, 250b for the venue-cast on a same frequency band as the forward link channel. In the presently described embodiment, base station BTS provisions time slots for the venue-cast in advance and blanks (vacates) the time slots so that they do not contain WAN data. Local transmitter AP detects the arrival of the provisioned time slots using the pilot and MAC information and transmits so that the venue-cast data 250 occupies the vacated intervals.

Base station BTS can allocate time slots for the venue-cast statically or dynamically. For example, with a long-term allocation, base station BTS can reserve predetermined slots in the forward link channel for use by the venue-cast. Alternatively, one or more logical channels can be allocated and base station BTS can communicate a logical channel mapping to local transmitter AP. With a dynamic allocation, local transmitter AP can determine its transmit timing based on the logical channel mapping.

In operation, the venue-cast is seamlessly integrated with the services of the wireless access network. Put another way, from the standpoint of the access terminal, the source of the venue-cast content may be indistinguishable from other services on the macro access network promoting a better user experience.

Figure 3:
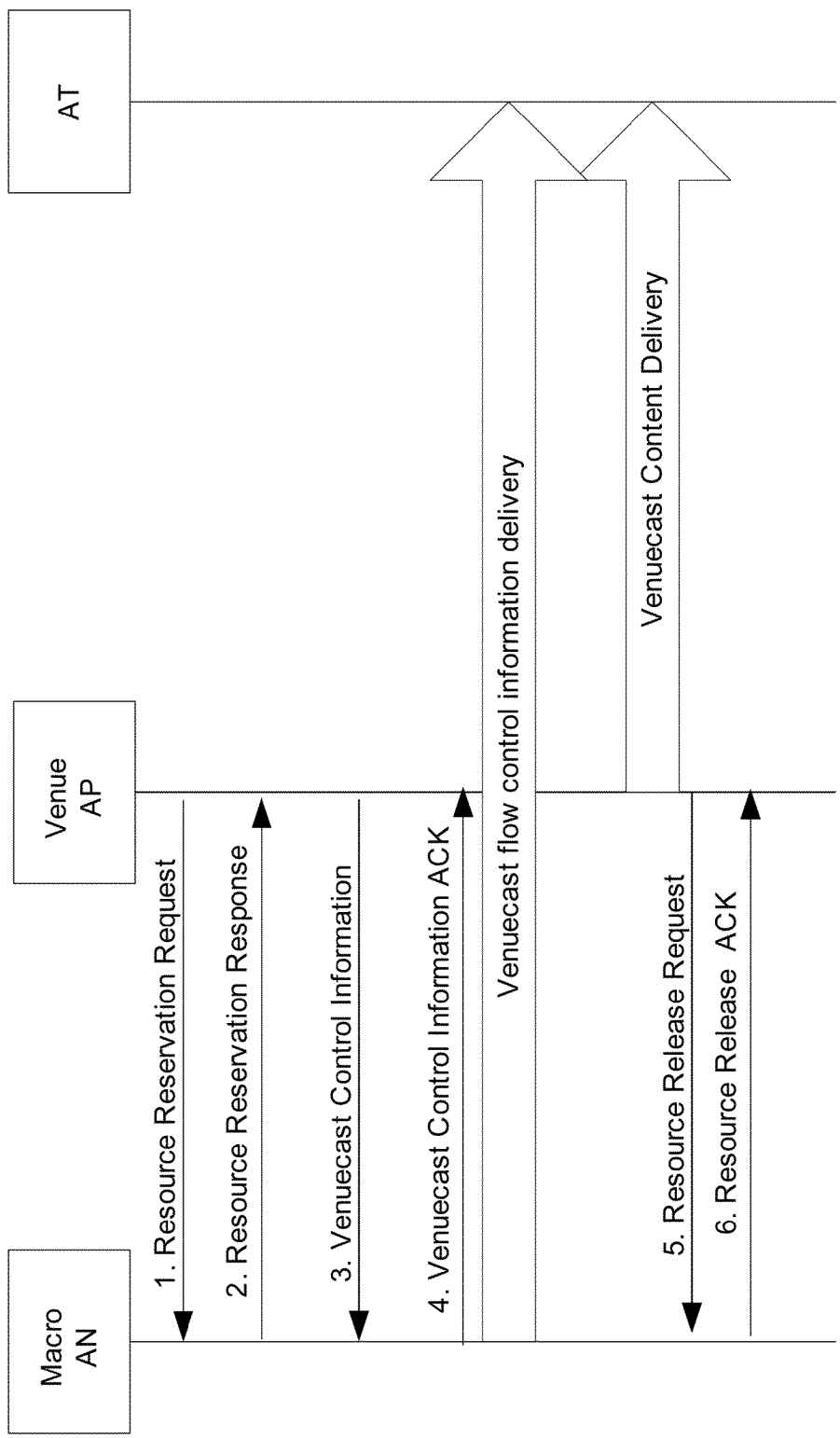
FIG. 3 shows aspects of air link resource provisioning in a venue-cast system.

FIG. 3 is a flow diagram showing an exemplary process for venue-cast resource provisioning. Prior to starting venue-cast service, the local transmitter AP can request allocation of resources (1) on the forward channel. The request can specify a number of BCMCS flows, a number of multiplexes for each BCMCS flow, BCMCS flow identifiers (flowIDs), application information, and other provisioning parameters for the venue-cast service. For example, the local transmitter AP may request air link resources for multiple venue-cast streams such as text, audio, and video coverage of an event and can specify an application protocol for each such stream (e.g., HTML, MP3, MPEG4, etc.), Responsive to the request, the macro access network AN can reserve air link resources by, for example, scheduling an appropriate number of blank time slots to accommodate the venue-cast transmission. If the macro AN supports multicast service, flowIDs can be used to differentiate content flows from the macro AN from venue/local services. For example, the macro AN and the local AP can coordinate the use of flowIDs by exchanging signaling.

In a next part of the provisioning process, the AN can authenticate the request. Authorization can be based on femto-cell standards and can establish the identity and privileges of the local transmitter. Communication between the local transmitter AP and the access network AN can be protected by an IPSec (Internet Protocol Security) tunnel or other secure means. When the local transmitter AP is properly authenticated, the access network AN can acknowledge (2) the request and take steps to reserve air link resources for the venue-cast. Configuration parameters such as BCMCSOverheadPeriod, framing setup, etc. can be sent to the local transmitter with the acknowledgment.

The macro AN can also announce the availability of venue-cast services. For example, in EV-DO networks, information about the venue-cast can be sent over the control channel in a broadcast overhead message. The local transmitter AP can provide control information for the venue-cast (3) in advance. For example, the local transmitter AP can provide information for scheduling traffic flows of venue content and other control information such as mappings for the BCMCS flow-IDs and multiplexes. Also, the local transmitter AP can send information for demodulating the venue-cast transmission such as Reed Solomon coding parameters, etc. to the macro AN in advance of the venue-cast service.

The macro AN can acknowledge receipt of the venue-cast control information (4) and add the control information to its overhead message so that the venue-cast can be identified and accessed using the reserved resources. The local transmitter AP can then initiate transmission of the venue-cast using the reserved air-link resources. For example, the local transmitter can begin co-channel transmission in the assigned timeslot for each multiplex. When venue-cast service is no longer required, the local transmitter AP can authenticate itself to the AN and request release (5) of the reserved resources. The AN can acknowledge release of the air link resources (6) freeing them for other uses in the macro access network.

Given the desirability of co-channel plug-and-play operation, embodiments of the local transmitter can operate to minimize possible interference with macro DO network while providing adequate coverage for the venue-cast service. For example, if the venue-cast transmit power is not properly adjusted in relation to the macro access network, desensing can occur. If venue power is too high, it may impact the quality of macro network transmission in adjacent carriers. If it is too low, power from adjacent carriers of the macro network could cause adjacent channel interference (ACI) to venue-cast transmissions.

Additionally, in some communication systems, the automatic gain control (AGC) operating point of the access terminal receiver can be set based on the forward channel signal. For example, the AGC point of the access terminal receiver may be inaccurate due to the different wireless channels when the base station is far from the venue location. If the received signal energy of venue-cast traffic is significantly higher than that of the forward link signal, saturation of data samples could occur. The effect of such saturation could adversely affect higher order QAM modulated symbols, such as QAM-16 and, to a lesser extent, QPSK (quadrature phase-shift keying) symbols.

Finally, since transmission of the venue-cast is coordinated with data transmission on the macro network, timing can be an issue. For example, the FFT (Fast Fourier transform) window at the access terminal receiver can be set based on the pilot signal from the macro network. Given the localized nature of the venue-cast, it is highly likely that the earliest arrival path from the macro waveform will come later than the venue-cast waveform, possibly resulting in performance loss to venue-cast data demodulation.

Figure 4:
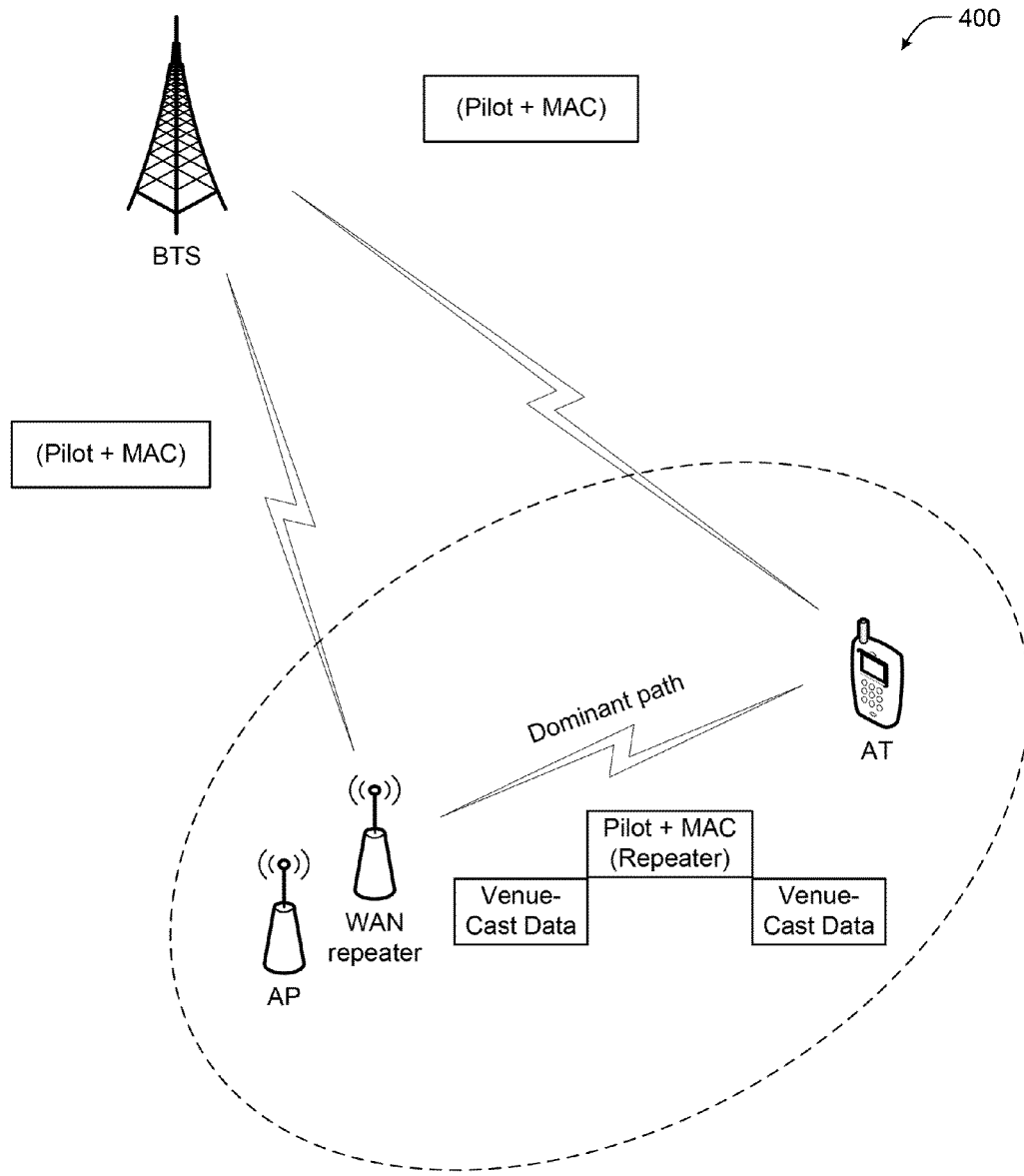
FIG. 4 is a block diagram of a venue-cast system having a wide-area network repeater.

FIG. 4 is a block diagram of a further embodiment of a venue-cast system 400. Venue-cast system 400 is similar to the embodiments described in connection with FIGS. 1-3, with changes to increase the reliability of venue-cast service while minimizing possible interference with the macro network.

In the exemplary architecture, a WAN repeater is collocated with the local transmitter AP inside of the venue (dotted lines). The WAN repeater functions as a bent-pipe repeater for signals from BTS and can be separate from or integrated with the local transmitter AP. In some embodiments, the WAN repeater is implemented as a femto-cell. The local transmitter AP can use the forward link signal from either the repeater or the BTS for its timing reference and can, for example, establish a power level for the venue-cast signal based on the transmit power level of the WAN repeater.

With the WAN repeater as a reference, the venue-cast content and the macro Pilot/MAC bursts are sent with power and timing in a similar range. The access terminal AT receiver observes a dominant path from the macro access network with similar power and timing offset as the venue-cast from local transmitter AP. This mitigates possible saturation, timing offset, and desensing issues. In those cases where the venue is located near to the site of the base station BTS, venue transmission power may be increased somewhat so that venue-cast service is not overwhelmed by the base station.

Figure 5A:
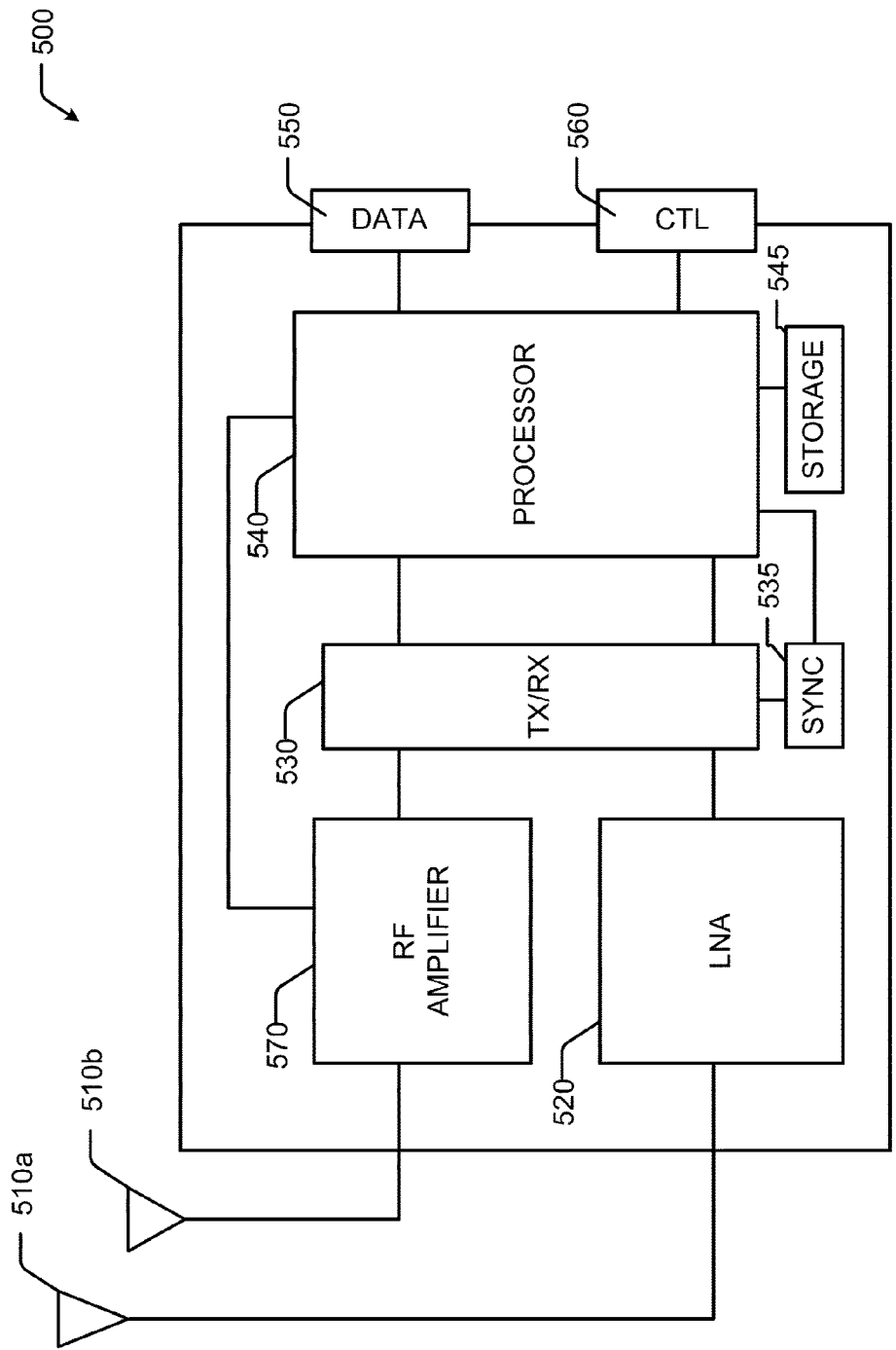
FIGS. 5A-5B are block diagrams of embodiments of a local transmitter.

FIG. 5A is a block diagram of one embodiment 500 of a local transmitter. Local transmitter 500 can function in a manner similar to that described in FIGS. 1-3 and can also be used with venue-cast system 400 as previously described.

A processor 540 controls operation of local transmitter 500. Processor 540 can include one or more microprocessors, microcontrollers, field-programmable gate arrays (FPGAs), application-specific integrated circuits (ASICs), complex programmable logic devices (CPLD), or other fixed or programmable logic elements.

As shown, processor 540 is coupled with storage 545. Storage 545 can include read-only memory (ROM) and/or random-access memory (RAM) for storing data and program instructions accessible to processor 540. In some embodiments, storage 545 can include other computer-readable media such as optical and magnetic disk drives, flash memory, and the like. These computer-readable media can be encoded with instructions for carrying out the operations of local transmitter 500.

Processor 540 can also be coupled to a data interface 550 and a control interface 560. Data interface 550 can be configured to receive the venue-cast content from one or more sources external to local transmitter 500. Venue-cast content can include audio, video, and text-based information or any combination thereof. In some embodiments, the venue-cast content includes one or more MPEG2 (Motion Picture Experts Group), MPEG4, or like streams optimized for viewing at a data rate of the venue-cast transmission.

Processor 240 can communicate with the macro access network via control interface 560. Control interface 560 can support secure communication with the access network through, for example, an IPSec tunnel or other encrypted connection. In some embodiments, control interface 560 is omitted and transceiver 530 provides communications between local transmitter 500 and the macro access network.

When local transmitter 500 is activated, processor 540 can initiate a provisioning process with the access network similar to that described in FIG. 3. This can include, for example, sending resource reservation requests and venue-cast control information to the macro network via control interface 560. The resource reservation requests and control information can be based on the content received at data interface 550. For instance, if the venue-cast includes three streams, processor 540 can request air link resources based on the aggregate bandwidth requirement. Similarly, processor 540 can reserve an appropriate number of flowIDs and provide control and application information for identifying, demodulating, and processing the venue-cast content.

In operation, local transmitter 500 receives the forward link signal at antenna 510a. Separate transmit 510b and receive 510a antennas are shown, however this is not a requirement of the local transmitter. The forward channel signal can be received directly from a base station such as base station BTS of venue-cast system 100, or it can be received from a WAN repeater such as the WAN repeater of venue-cast system 400.

Antenna 510a is coupled to a low-noise amplifier 520 which amplifies the received forward link signal and delivers it to transceiver 530 for processing.

Transceiver 530 can demodulate and decode the received signal to detect a timing reference for the venue-cast transmission. With an EV-DO network, this can involve detecting the pilot signal and MAC information for time slots in a multiplex. In the presently described embodiment, synchronization module 535 is coupled to transceiver 530 and delivers its output to processor 540. The synchronization module 535 can generate a clock signal from the macro network pilot. Based on the clock signal, processor 540 can schedule transmission of the venue-cast on the forward channel frequency to coincide with the arrival of the reserved time slots. Alternatively or additionally, processor 540 can schedule the venue-cast based on an external timing reference. For example, processor 540 can be configured to receive macro network timing information via control interface 560.

On the transmit path, processor 540 delivers the venue-cast content to transceiver 530. Transceiver 530 performs coding, modulation, and related operations. In one embodiment, the modulation is OFDM-based and may conform with Platinum BCMCS or related standards. In particular, transceiver 530 may insert a dedicated pilot into the transmit signal to facilitate coherent demodulation at the access terminal receiver. Although not required, adherence to industry standards such as Platinum BCMCS permits plug-and-play access to the venue-cast and leverages a large installed base of access terminal equipment.

Transceiver 530 delivers the modulated venue-cast signal to RF amplifier 570. RF amplifier 570 can be configured to adjust a power level of the venue-cast signal and to couple the amplified signal to transmit antenna 510b. In some embodiments, processor 540 adjusts the power level of RF amplifier 570 based on the received signal strength. As previously discussed, the transmit signal strength should permit the venue-cast to be received by access terminals located within the venue while avoiding interface with adjacent channels on the macro network. The signal strength of the forward channel signal can provide one reference for adjusting venue-cast transmit power.

Figure 5B:
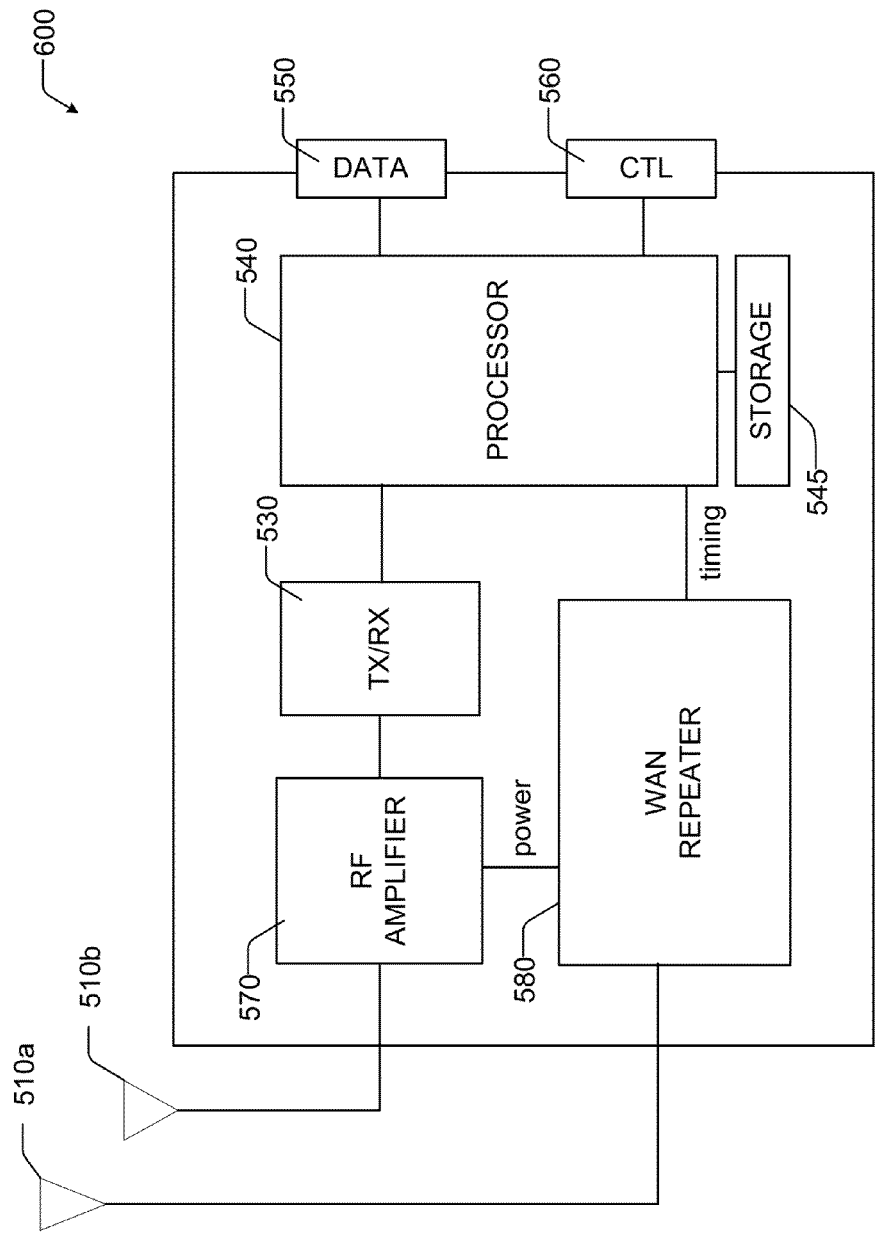

FIG. 5B is a block diagram of a further embodiment of a local transmitter 600. Local transmitter 600 is similar to local transmitter 500 but adds an integrated WAN repeater 580. A description of elements common to the different embodiments of the local transmitter is omitted for clarity.

WAN repeater 580 is configured to detect and to replicate the forward link signal from the macro access network. As shown, WAN repeater 580 can also provide a timing reference to processor 540 based on the forward link signal. Processor 540 can be configured to schedule data for the venue-cast transmission based on the timing reference from WAN repeater 580. For example, WAN repeater 580 can provide pilot signal and MAC information to processor 540 and processor 540 can identify time slots in the forward In addition, WAN repeater 580 can generate a reference signal for controlling venue-cast transmit power. The reference can be used to set the operating point of RF amplifier 570 so as to mitigate possible interference with the macro network. Using the power and timing references, local transmitter 600 can provide co-channel venue-cast service to access terminals within its coverage area in a seamless fashion, enabling access terminals to receive venue-cast programming as well as other services from the macro network on a same frequency band.

Figure 6:
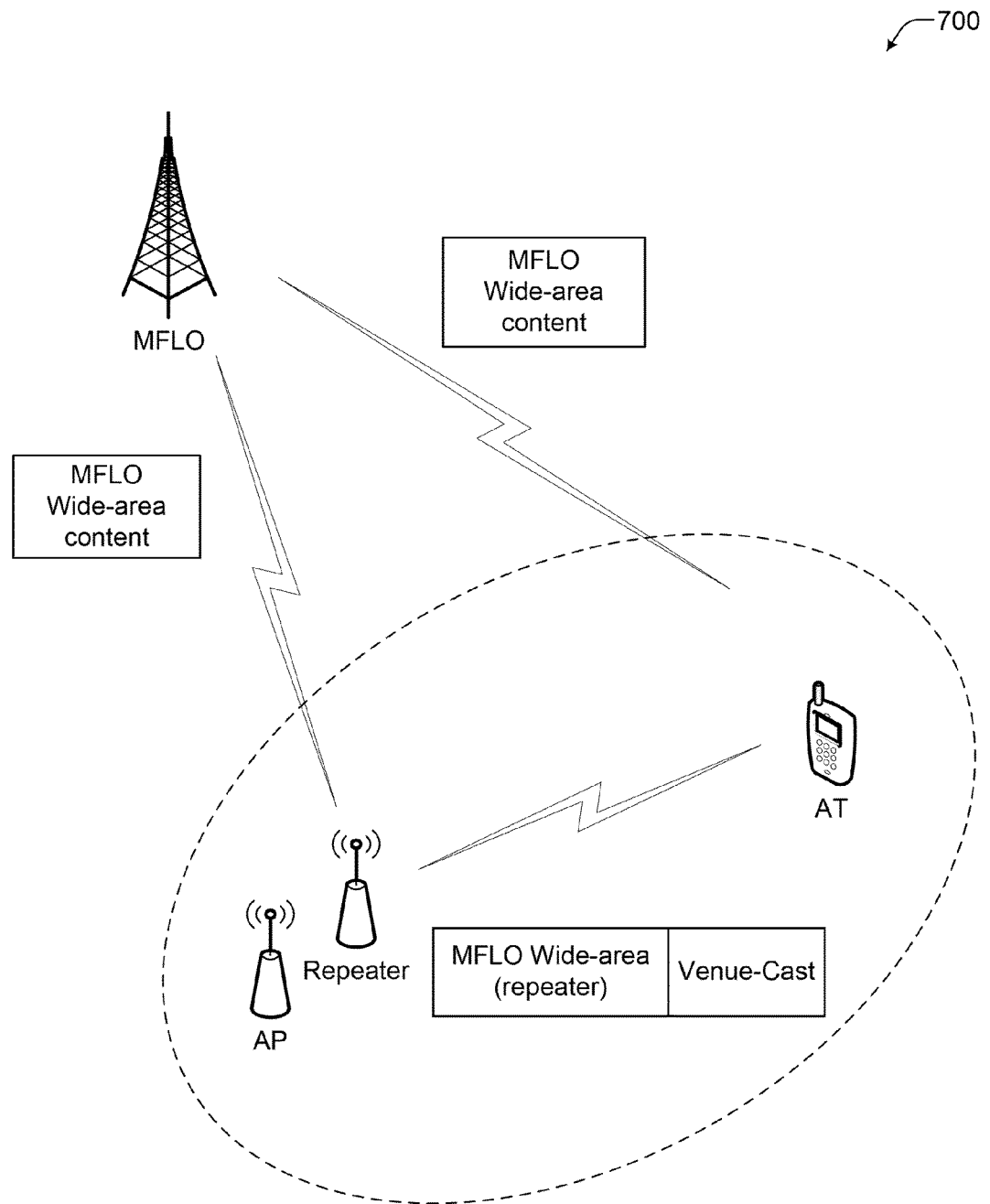
FIG. 6 shows a venue-cast system that is used with a mobile television system.

FIG. 6 depicts a further embodiment of a venue-cast system 700. Venue-cast system 700 is similar to venue-cast system 400 except that it has been adapted for use with the MediaFLO™ media distribution system (MDS).

MediaFLO is a forward-link only (FLO) network that is optimized for delivering multicast content to a large number of access terminals. MediaFLO can operate over EV-DO, UMTS (Universal Mobile Telecommunications System), Gold/Platinum BCMCS, and FLO technology and can support interactive applications that utilize the reverse link of the cellular network.

As shown, a terrestrial transmitter MFLO provides forward link service to terminals AT in its coverage area. A local transmitter AP and collocated WAN repeater provide co-channel venue-cast service with the MediaFLO content in a manner similar to that described in FIG. 2 and FIG. 4. In essence, a fraction of the OFDM time and sub-carrier slots can be blanked out from the broadcast waveform of the terrestrial transmitter. The vacated slots can be filled by transmissions from local transmitter AP. Both the terrestrial transmitter MFLO and the local transmitter AP can utilize the MediaFLO waveform.

Figure 7:
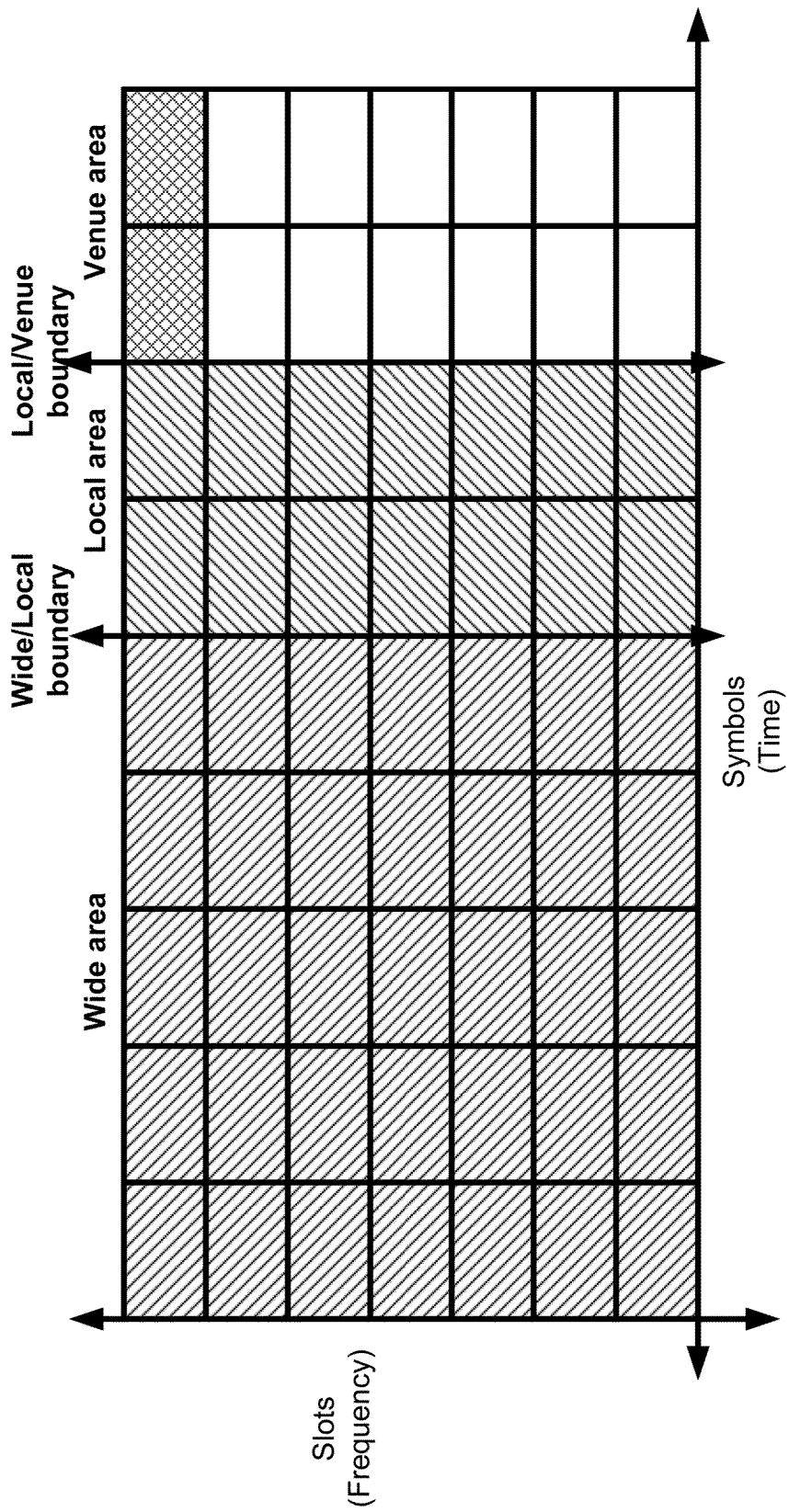
FIG. 7 shows aspects of venue-cast operation with a mobile television system.

FIG. 7 shows an exemplary data symbol partition for an MDS system. Within existing MDS systems, OFDM symbols are divided among wide area and local area transmissions. Wide-area transmissions, for example, can include national programming which is distributed throughout a large coverage area, whereas local programming can be specific to a particular transmitter MFLO or a small number of transmitters.

Venue-cast system 700 can transmit on one or more time slots allocated for local area usage. For purposes of illustration, venue-cast time slots are shown as a logical partition of the local area symbols. However, it is not necessary for the MediaFLO system to distinguish between local-area and venue-area symbols or to allocate air link resources in any particular fashion to accommodate the embodiments of the present invention.

As with venue-cast system 400, local transmitter AP reserves resources on the MDS system and provides control information used to advertise the availability of the venue-cast services. For example, local transmitter AP can request a reservation of air link resources in the forward link transmission of terrestrial transmitter MFLO. Terrestrial transmitter MFLO can then distribute information about the venue-cast in a manner analogous to the BOM messages from base station BTS.

Figure 8:
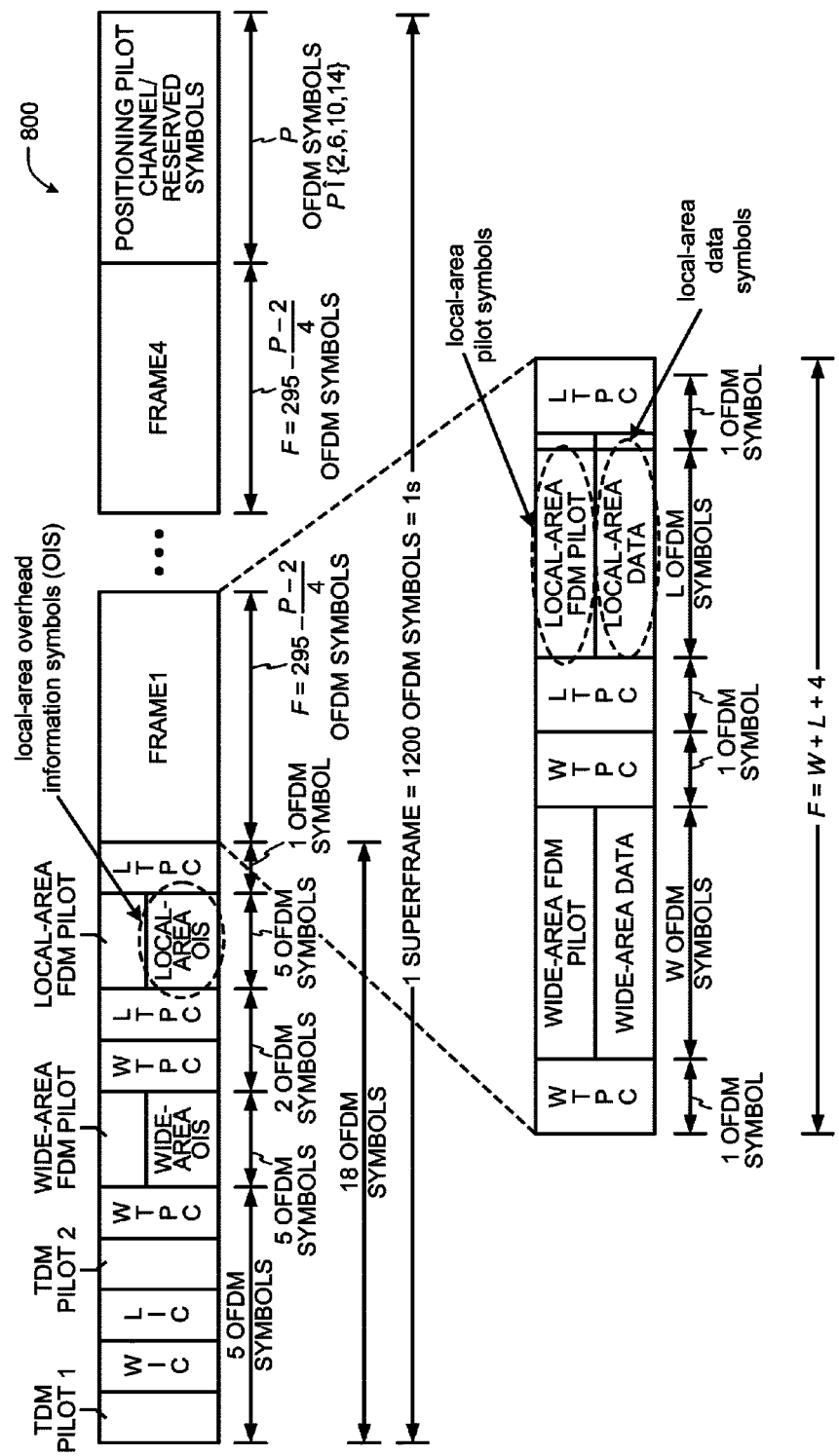
FIG. 8 shows further aspects of venue-cast operation with a mobile television system.

FIG. 8 shows an exemplary superframe 800 such as can be used in a MediaFLO distribution system. To facilitate the venue-cast service in the presence of wide-area transmissions, overhead information symbols that identify the position and characteristics of the venue-cast can be added to each super-frame. One approach is to use data and control signals that are currently provided for local-area multicasts. For example, venue-cast control information could be included with existing local-area OIS (overhead information symbols) symbols and venue-cast data could be added to the local-area portion of data frames. With this approach, existing local area symbols can be utilized with venue-cast service enabling existing devices to seamlessly receive the co-channel FLO-based venue-cast service.

As an alternative approach, new control and data systems could be added to support venue-cast services. For example, new overhead information symbols could be inserted into the superframe after the Local OIS, or new symbols could be added to a specially-designated venue transmission area. With the availability of venue-cast identifiers and OIS, users can receive the channels specially designated for venue-cast service via the standard MediaFLO signaling and processing mechanisms now available. In both cases, the MDS system can reserve a number of blank time slots for use by the venue-cast service and can announce venue-cast availability in those time slots.

When air link resources have been provisioned for the venue-cast, local transmitter AP can detect the local-area pilot symbols corresponding to its time slots and transmit the FLO-based venue-cast service on the vacated time slots. To mitigate possible issues with data symbol scaling, timing alignment, and desensing, the terrestrial MediaFLO signals can be repeated from the collocated WAN repeater. In this way, the co-channel venue-cast from local transmitter AP becomes integrated with other MediaFLO services.

Figure 9:
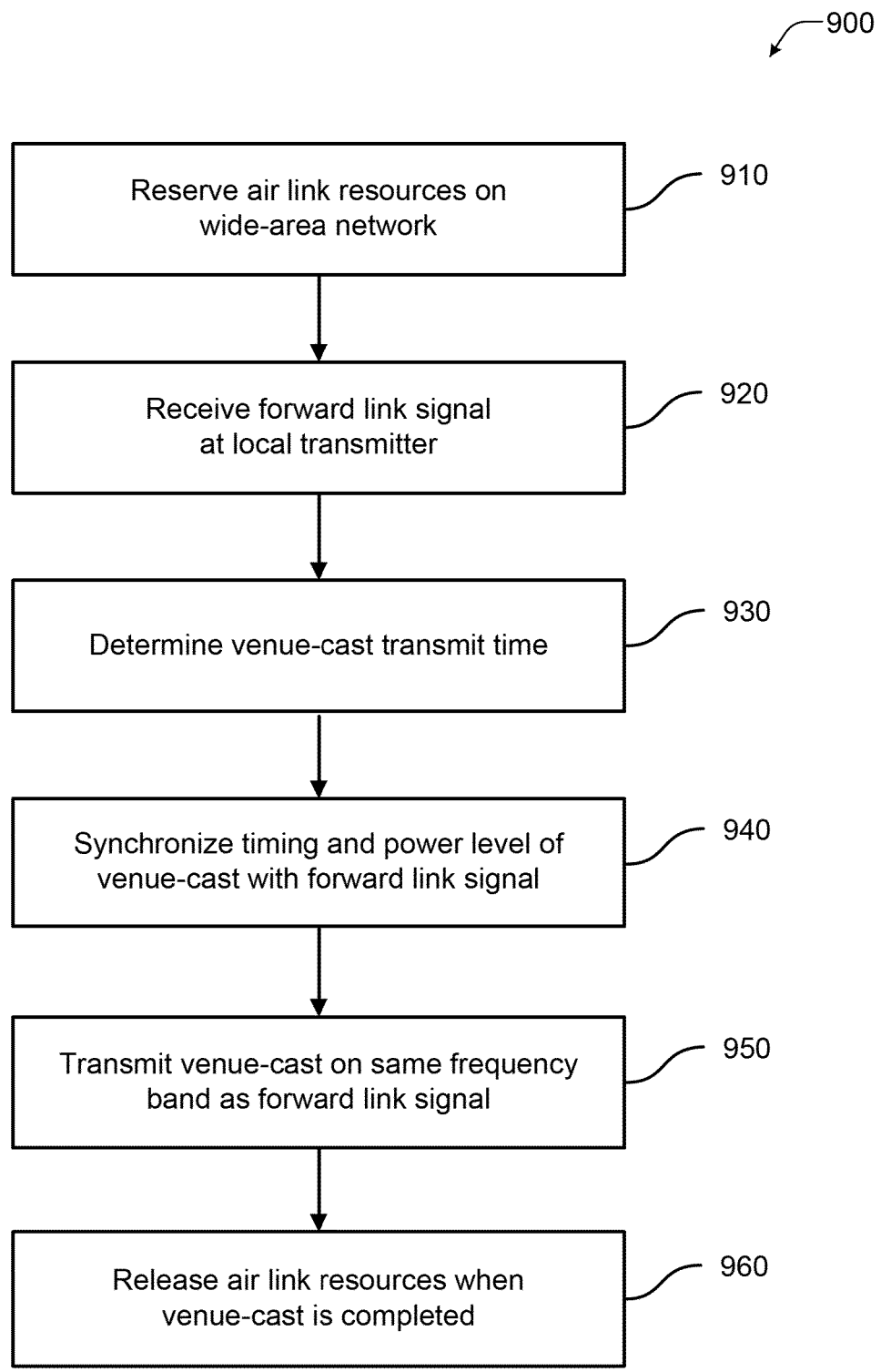
FIG. 9 is a flowchart of one embodiment of a venue-cast process.

FIG. 9 is a flowchart of one embodiment of a venue-cast process 900 in accordance with the present invention. Process 900 can be implemented by a local transmitter as described herein or using a combination of a local transmitter and WAN repeater.

At block 910, the local transmitter reserves air link resources on a wide-area network. The wide-area network can be an EV-DO network, a MediaFLO network, or some other macro access network for which co-channel venue-cast transmission is desired. The macro network can provision resources for the venue-cast by blanking time slots or otherwise allocating unused bandwidth to the local transmitter.

The local transmitter can receive the forward link signal from the macro network as illustrated by block 920. The forward link signal can be received directly from a base station, terrestrial transmitter, or other source, or it can be received from a repeater or other signal replicating device. Regardless of the source, at block 930, the local transmitter monitors timing information derived from the forward link signal and determines a transmit time for the venue-cast based on the forward link signal.

At block 940, the local transmitter synchronizes its timing and power with the forward link signal. This can involve setting a power level so as to avoid interference with adjacent channels of the macro network as well as time-aligning the venue-cast transmission with a pilot signal or other reference from the macro network. In some embodiments, the local transmitter synchronizes its transmission with the output of a collocated WAN repeater to mitigate timing and power issues with the macro network signaling.

When the time for transmitting the venue-cast arrives, at block 950 the local transmitter provides venue-cast service on a same frequency band as the forward link signal. The venue-cast waveform can be OFDM-based as OFDM-based signaling is used with both EV-DO networks and MediaFLO distribution systems. However, this is not a requirement of the venue-cast system and the local transmitter can use some other modulation with a dedicated pilot signal.

During its operation, the venue-cast system cooperates with the macro network to provide an enhanced user experience. The venue-cast supplements the macro network within a localized area, but does not interfere with its overall operation. The macro network can facilitate access to the venue-cast by advertising its availability and characteristics. At block 960, when the venue-cast is completed, the local transmitter releases its air link resources back to the macro network.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, or in combination of hardware and software, such as a processor executing program instructions.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A venue-cast transmitter comprising:
a receiver configured to receive a forward link signal comprising a timing reference for data transmitted on a wireless access network and to obtain a logical channel mapping for the wireless access network, the logical channel mapping being indicative of a dynamic allocation of at least one vacated time slot in the forward link signal;
a transmitter configured to transmit a data signal comprising venue-cast content in a same frequency band as the forward link signal; and
a processor coupled to the transmitter and the receiver and configured to detect the at least one vacated time slot in the forward link signal based on the timing reference and the logical channel mapping and to output the data signal during an interval defined by the at least one vacated time slot.

2. The venue-cast transmitter of claim 1, further comprising:
an RF amplifier configured to control a power level of the transmitted data signal, and wherein the processor is configured to determine the power level in relation to a power level of the forward link signal.

3. The venue-cast transmitter of claim 1, further comprising:
a data interface configured to receive the venue-cast content, and wherein the processor is configured to add the venue-cast content to the data signal.

4. The venue-cast transmitter of claim 1, further comprising:
a control interface in data communication with the wireless access network, and wherein the processor is configured to send a resource-reservation request to the wireless access network via the control interface.

5. The venue-cast transmitter of claim 4, wherein the control interface is configured to receive a response to the resource-reservation request, said response including an identifier of the at least one vacated time slot.

6. The venue-cast transmitter of claim 4, wherein the processor is configured to send control information corresponding to the localized content to the wireless access network via the control interface.

7. The venue-cast transmitter of claim 6, wherein the control information comprises information for signaling the availability and quantity of the data signal and for demodulating the data signal.

8. The venue-cast transmitter of claim 1, wherein the timing reference defines a plurality of time slots and the forward link signal comprises unicast data in at least some of the plurality of time slots.

9. The venue-cast transmitter of claim 1, wherein the data signal comprises a dedicated pilot.

10. The venue-cast transmitter of claim 1, wherein the transmitted data signal is an orthogonal frequency division multiplexed (OFDM) signal.

11. The venue-cast transmitter of claim 1, wherein the wireless access network comprises at least one of a mobile television network and a cellular mobile network.

12. The venue-cast transmitter of claim 1, wherein the forward link signal is received from a wide area network repeater co-located with the venue-cast transmitter.

13. A method of providing venue-cast content with a local transmitter within a coverage area of a wireless access network, the method comprising:
receiving venue-cast content at a first interface of the local transmitter;
receiving a forward link signal of the wireless access network at a second interface of the local transmitter;
obtaining a logical channel mapping for the wireless access network, wherein the logical channel mapping is indicative of a dynamic allocation of at least one vacated time slot in the forward link signal;
detecting in the forward link signal a timing reference for data transmitted on the wireless access network;
detecting the at least one vacated time slot in the forward link signal based on the timing reference and the logical channel mapping; and
transmitting a second signal comprising the venue-cast content in a same frequency band as the forward link signal during an interval defined by the at least one vacated time slot.

14. The method of claim 13, further comprising:
adjusting with an RF amplifier a power level of the second signal based on a power level of the forward link signal.

15. The method of claim 13, further comprising:
requesting a reservation of time slots in the forward link signal from the wireless access network; and
receiving identifiers from the wireless access network corresponding to the at least one vacated time slot in the forward link signal.

16. The method of claim 13, further comprising:
sending information about the venue-cast content and a modulation of the second signal to the wireless access network.

17. The method of claim 13, wherein the wireless access network comprises at least one of a mobile television network and a cellular mobile network.

18. A localized content transmission system, comprising:
a repeater configured to replicate a forward link signal of a wireless access network;
a receiver configured to receive the forward link signal from the repeater, to detect a timing reference for data transmitted on the wireless access network, and to obtain a logical channel mapping for the wireless access network, the logical channel mapping being indicative of a dynamic allocation of at least one vacated time slot in the forward link signal;
a transmitter configured to transmit a data signal including localized content in a same frequency band as the forward link signal; and
a processor configured to detect the at least one vacated time slot in the received forward link signal based on the timing reference and the logical channel mapping and to output the data signal to coincide with the at least one vacated time slot.

19. The system of claim 18, wherein the wireless access network comprises at least one of a mobile television network and a cellular mobile network.

20. The system of claim 18, wherein the local transmitter is an orthogonal frequency division multiplex (OFDM) transmitter, and the data signal comprises at least one dedicated pilot.

21. The system of claim 18, wherein the local transmitter comprises a power amplifier and wherein a power level of the transmitted data signal is based on a power level of the forward link signal from the repeater.

22. The system of claim 18, wherein the local transmitter comprises a control interface in data communication with the wireless access network.

23. The system of claim 22, wherein the local transmitter is configured to send resource reservation requests to the wireless access network via the control interface.

24. The system of claim 18, wherein the local transmitter comprises a data interface configured to receive the localized content from one or more sources.

25. A venue-cast system, comprising:
means for receiving a forward link signal of the wireless access network;
means for repeating the forward link signal;
means for detecting a timing reference for data transmitted on the wireless access network in the repeated signal;
means for obtaining a logical channel mapping for the wireless access network, wherein the logical channel mapping is indicative of a dynamic allocation of a vacated time slot in the forward link signal;
means for determining the arrival of the vacated time slot in the forward link signal based on the timing reference and the logical channel mapping; and
means for transmitting a second signal comprising localized content in a same frequency band as the forward link signal of the wireless access network based on the timing reference and the logical channel mapping during an interval defined by the vacated time slot.

26. The venue-cast system of claim 25, further comprising:
means for adjusting a power level of the transmitted data signal based on a power level of the repeated signal.

27. The venue-cast system of claim 25, further comprising:
means for receiving the localized content from one or more sources; and
means for adding the localized content to the second signal.

28. The venue-cast system of claim 25, further comprising:
means for sending a resource-reservation request to the wireless access network.

29. The venue-cast system of claim 28, further comprising:
means for receiving a response from the wireless access network to the resource-reservation request.

30. A non-transitory computer-readable medium having encoded thereon a sequence of one or more program instructions for causing one or more processors of a local transmitter to perform steps comprising:
receiving a forward link signal of a wireless access network at the local transmitter;
detecting a timing reference in the forward link signal for data transmitted on the wireless access network;
obtaining a logical channel mapping for the wireless access network, wherein the logical channel mapping is indicative of a dynamic allocation of at least one vacated time slot in the forward link signal;
detecting the at least one vacated time slot in the forward link signal based on the timing reference and the logical channel mapping; and
transmitting a second signal comprising the venue-cast content in a same frequency band as the forward link signal to coincide with the at least one vacated time slot.

31. The venue-cast transmitter of claim 1, wherein the processor is further configured to obtain the logical channel mapping from the wireless access network.

* * * * *